(12) United States Patent
Basso et al.

(10) Patent No.: US 10,000,273 B2
(45) Date of Patent: Jun. 19, 2018

(54) PASSIVE LOAD ALLEVIATION FOR A FIBER REINFORCED WING BOX OF AN AIRCRAFT WITH A STIFFENED SHELL STRUCTURE

(71) Applicants: Airbus Operations GmbH, Hamburg (DE); AIRBUS SAS, Blagnac (FR)

(72) Inventors: Pasquale Basso, Hamburg (DE); Bernd Tomschke, Hamburg (DE)

(73) Assignees: Airbus Operations GmbH (DE); AIRBUS SAS (FR)

( * ) Notice: Subject to any disclaimer, the term of this patent is extended or adjusted under 35 U.S.C. 154(b) by 1156 days.

(21) Appl. No.: 13/971,916

(22) Filed: Aug. 21, 2013

(65) Prior Publication Data

US 2014/0054420 A1 Feb. 27, 2014

Related U.S. Application Data

(60) Provisional application No. 61/691,910, filed on Aug. 22, 2012.

(30) Foreign Application Priority Data

Aug. 22, 2012 (EP) ..................................... 12181411

(51) Int. Cl.
*B64C 3/18* (2006.01)
(52) U.S. Cl.
CPC ............... *B64C 3/185* (2013.01); *B64C 3/18* (2013.01)
(58) Field of Classification Search
CPC .. B64C 1/12; B64C 3/18; B64C 3/182; B64C 3/26; B64C 3/185; B32B 55/12

(Continued)

(56) References Cited

U.S. PATENT DOCUMENTS 4,606,961 A * 8/1986 Munsen et al. ................ 428/119
6,314,630 B1 * 11/2001 Munk et al. ............... 29/407.01
(Continued)

FOREIGN PATENT DOCUMENTS

CN 1213998 A 4/1999
CN 102036879 A 4/2011
(Continued)

OTHER PUBLICATIONS

Zhenjie Tang, Optimization Design for Box of Composite Wing Based on Effective Stiffness Matrix, Journal of Nanjing University of Aeronautics & Astronautics, vol. 43, No. 4, Aug. 2011.

(Continued)

*Primary Examiner* — Tien Q Dinh
*Assistant Examiner* — Vicente Rodriguez
(74) *Attorney, Agent, or Firm* — Lerner, David, Littenberg, Krumholz & Mentlik, LLP

(57) ABSTRACT

A wing box of an aircraft with a stiffened shell structure, consisting of fiber reinforced material includes a skin for absorbing shear loads, and several stringers arranged on the inner side of the wing box for absorbing axial loads, in which at least 60% of the mass of the stiffened shell structure is concentrated in the stringers, wherein the stringers provide at least 80% of the axial stiffness of the stiffened shell structure. In the specific case of wing structure, this embodiment allows the use of unbalanced laminates for the skin to induce higher nose-down twist of the wing box without any loss in bending stiffness and so envisaging higher weight saving capability.

13 Claims, 3 Drawing Sheets

(58) Field of Classification Search
USPC .................................................... 244/123.1
See application file for complete search history.

(56) References Cited

U.S. PATENT DOCUMENTS

| | | |
|---|---|---|
| 6,908,526 B2 * | 6/2005 | Bequet .......................... 156/189 |
| 7,814,729 B2 | 10/2010 | Normand et al. |
| 2003/0098116 A1 | 5/2003 | Bequet |
| 2005/0236524 A1 * | 10/2005 | Sarh ............................. 244/124 |
| 2008/0265093 A1 | 10/2008 | Munoz Lopez et al. |
| 2009/0001218 A1 | 1/2009 | Munoz Lopez et al. |
| 2009/0206203 A1 | 8/2009 | Crawford |
| 2009/0282668 A1 | 11/2009 | Sanchez-Brunete Alvarez |
| 2012/0121854 A1 | 5/2012 | Yoshida et al. |
| 2012/0177872 A1 * | 7/2012 | Tsai et al. ..................... 428/113 |
| 2012/0193473 A1 | 8/2012 | Casado Abarquero et al. |

FOREIGN PATENT DOCUMENTS

| | | |
|---|---|---|
| CN | 102481971 A | 5/2012 |
| FR | 2 902 689 A1 | 12/2007 |

OTHER PUBLICATIONS

Chinese Office Action dated Apr. 3, 2015.

\* cited by examiner

PASSIVE LOAD ALLEVIATION FOR A FIBER REINFORCED WING BOX OF AN AIRCRAFT WITH A STIFFENED SHELL STRUCTURE

CROSS-REFERENCE TO RELATED APPLICATIONS

This application claims the benefit of filing date of European Patent Application No. 12 181 411.5 filed Aug. 22, 2012 and of U.S. Provisional Patent Application No. 61/691,910 filed Aug. 22, 2012, the disclosure of which applications are hereby incorporated herein by reference.

TECHNICAL FIELD OF THE INVENTION

The invention relates to a wing box of an aircraft with a stiffened shell structure, consisting of fiber reinforced material comprising a skin for absorbing shear loads, and several stringers arranged on the inner side of the wing box for absorbing axial loads.

The field of the invention extends to the control of the wing deformation by taking advantage of the anisotropy of composite materials in order to alleviate passively aerodynamic loads and consequently to reduce the weight of a wing structure.

In the manufacture of aircraft structures, the use of fiber reinforced composite materials such, as carbon fiber reinforced plastics, is becoming increasingly common for providing better weight and maintenance performances. Moreover, the anisotropy of composite materials provides a design space in tailoring the stiffness of a wing, i.e. some freedom, to control not only the load share among the wing structural components, as the skin and the stringers, but also the wing deformation. Such control, usually referred to as passive load alleviation, can be induced by the stiffness of the structure itself without any control laws of external systems.

As a matter of fact, the relative speed of the aircraft with respect to the air generates a vertical load, usually referred to as lift depending on the angle of attack. The lift distribution along the wingspan generates a bending moment with respect to the attachment of the wing at the fuselage, usually referred to as the wing root. The higher the angle of attack, the higher are the lift and the associated bending moment at wing root leading to higher wing weight.

Therefore the control of the wing deformation, usually referred to as aeroelastic tailoring, to reduce the angle of attack of the outer wing, referred to as nose-down twist of the wing, is a way to reduce the structural weight of the wing.

BACKGROUND OF THE INVENTION

It is common knowledge that the aircraft industry requires structures that on one hand withstand the loads to which they are subjected, meeting high requirements on strength and stiffness, and on the other hand are as light as possible. The main structure of the aircraft wing, usually referred to as the wing box, is particularly composed of skin and stringers. The skin is reinforced with stringers to reduce its thickness and so as to be competitive in weight According to common knowledge of a skilled person, skin and stringers of a wing box may be made of metallic material or carbon fiber reinforced plastic.

It is also common knowledge that a wing box has to withstand to bending, torsion, and shear. Due to their geometry skins as thin panels are better suited to resist shear loads caused by lift and torsion, while stringers as beams are better suited to resist axial loads caused by the bending moment.

In case of metallic wing boxes, the amount of axial load absorbed by each structural component of the wing box, as the skin and stringers, depends only on the cross sectional area ratio by assuming that skin and stringers are out of the same material.

In case of composite wing boxes the amount of axial load depends also on the elastic material properties of each structural component. Therefore orienting the main structural stiffness directions of each component, skin and stringer, in the appropriate direction can also control the amount of axial load absorbed by each component. For example, by orienting all fibers of the skin in +45°-direction and −45°-direction with respect to the longitudinal axis of the wing box, the stringers absorb about 30% higher loads. The skins become axially unloaded and may serve mainly for shear loads.

All passive load alleviation techniques known so far are based on the nonalignment of the main stiffness direction with respect to the wing axis. Such nonalignment can be achieved by sweeping the stringers and/or skin fibers' orientation with respect to wing axis. Such approaches are able to increase the nose-down twist but they also cause a loss in bending stiffness, which requires reinforcements. Hence the weight benefit envisaged by the higher nose-down twist on outer wing vanishes at the end.

Therefore it appears better to keep the stringers parallel to wing axis and let them work for wing bending mainly, neglecting quasi the role of skins to contribute to wing bending stiffness. The skins shall serve for shear mainly, also taking the torsion of the wing box. By taking advantage of the anisotropy of the composite materials, the lay-ups of skins alone are used as design space through forward/rearward oriented fibers in order to generate the desired nose-down twist on outer wing.

BRIEF SUMMARY OF THE INVENTION

An aspect of the present invention provides an aircraft composite wing box with enhanced passive load alleviation capability to achieve a high structural weight efficiency and operational robustness. In spite of increased structural performance, the present invention also simplifies and accelerates the manufacturing process because of a thinner, less ramped skin that leads furthermore to less complicated stringers.

According to an embodiment of the invention at least 60% of the mass of the stiffened shell structure is concentrated in the stringers, wherein the stringers provide at least 80% of the axial stiffness of the stiffened shell structure. Preferably more than 67% of the mass of the stiffened shell structure is concentrated in the stringers, which provide more than 90% of the axial stiffness of the stiffened shell structure. This makes it possible to use a thin skin for the shell structure without decreasing the strength and stability of the stiffened shell structure while improving its damage tolerance.

The advantage of the solution according to an embodiment of the invention, particularly, consists in the fact that the skin and the stringers are made of layers comprising carbon fiber reinforced plastic, which permits the structural specialization of skin and stringers in a more efficient way from the weight point of view, with respect to metal. Moreover these materials are in the case of the wing box, very important because of the anisotropic behavior. It is a key condition for the aeroelastic tailoring to use anisotropic material, to improve the flight performances of the aircraft by increasing the nose-down twist of the outer wing.

Preferably the skin is made of unbalanced laminates with up to 80% of forward swept fibers 15 and 20% of rearward swept fibers 16. The absolute value of fibers' sweep angle, measured from the wing axis in forward or rearward direction, is equal to the sweep angle of wing axis. Moreover, the skin is made of unbalanced laminates with fibers oriented along the shear main directions only. Unbalanced laminates are characterized in that the number of layers swept forward with respect to wing axis is not equal to the number of layers swept rearward (with respect to wing axis). By increasing the portion of forward swept layers to a relation of 60/40 or 80/20 additional nose-down twist will be generated in the outer wings, up to 50% increase. This kind of tailoring of the wing is allowed by the fact that the skins designed for shear contribute almost negligibly to the bending stiffness of the wing.

The highest nose-down effect is achievable by means of unbalanced skin laminates, if the absolute value of fibers' sweep angle, measured from the wing axis in forward or rearward direction, is equal to the sweep angle of wing axis.

Preferably the skin has a thickness of at least 1.8 mm up to 8 mm. Because of the thin skin made of fiber-reinforced plastics there is a relatively high weight saving potential.

The manufacturing layup-time is reduced. Moreover, because of the small number of layers, there is less skin ramping trough more homogeneous thickness distribution. Furthermore, the stringers are less complicated due to fewer ramping on skins. If more stability or strength is needed in a special portion, the skin should be thicker for absorbing higher shear.

According to a further measure of the invention it is proposed that the skin consists of at least 50% up to 100% of 30°-direction and/or 45°-direction layers, wherein 45°-direction represent the main shear direction. To generate the most nose-down twist for 30° wing sweep, 100% of the layers on the wing should be orientated in an angle of 30°. Manufacturing allows an unbalance up to 80/20 only, since four consecutive layers is the limit for the same direction.

The invention includes the technical teaching that the stiffened shell structure comprises at least one stringer with different cross-section dimensions. If more stability is needed for example in a special portion of the wings, the stringer should have bigger cross-sectional area r for absorbing higher axial loads. The cross-section dimensions of the stringers differ in the different portions of the wings.

According to an embodiment of the invention the stringers have double T-shaped cross-section, comprising three parts, a flange being arranged at the skin and forming an distal end, a foot showing away from the skin and forming another distal end and a web being arranged between the distal ends and connecting them to each other.

This stringer design with the double T-shaped cross-section allows that skin buckling confines between stringers. Moreover, there is a high post buckling capability. Furthermore, the centre of gravity of double T-shaped stringers is as close as possible to the skin and provides a smaller offset to attached skins, reducing the loss of bending inertia of wing box due to the increased dimension of the stringers, as in the case of high axial load areas. The double T shapes in conjunction with the higher percentage of mass concentrated in the stringers, also improves the stringer strength after fortuitous top edge impacts, which could occur during the manufacturing, increasing the stringer maximum strain level allowable.

According to a measure of the invention, it is proposed that the flange has a width of at least 60 mm up to 120 mm and a thickness of at least 2 mm up to 18 mm.

According to another additional aspect of the invention, it is possible that the foot has a width of at least 60 mm up to 120 mm and a thickness of at least 2 mm up to 6 mm. Moreover, the web has a height of at least 50 mm up to 60 mm and a thickness of at least 4 mm up to 18 mm.

The nose-down twist at the outer wings leads to an increase of inboard loading at higher load levels and decreases the wing root bending. Therefore the flange, web and foot defer at the different sections of the wing. For example, the thickness of the stringers increases from the outer wing to the middle wing and from the inner wing to the middle wing as well.

The invention includes the technical teaching that the stringers consist of 0°-direction and/or 45°-direction layers, wherein 45°-direction represents the main shear direction. Moreover, the stringers consist of at least 75% of 0°-direction layers. 0°-direction layers are very advantageous because of the axial loads which should be absorbed by the stringers. 45°-direction layers should be used for increasing the stability of the stringers in the main shear direction. Another measure of the invention in the case of the wing structures where unbalanced +/−30°-direction laminates are used for skin, is the substitution of the +/−45°-direction layer of the stringers with +/−30°-direction layers in order to reduce the Poisson mismatch between skin and stringer foot laminates which can causes the disbonding of the stringer from the skin.

BRIEF DESCRIPTION OF THE DRAWINGS

The foregoing and other aspects of the invention will become apparent following the detailed description of the invention, when considered in conjunction with the enclosed drawings.

Figure 1:
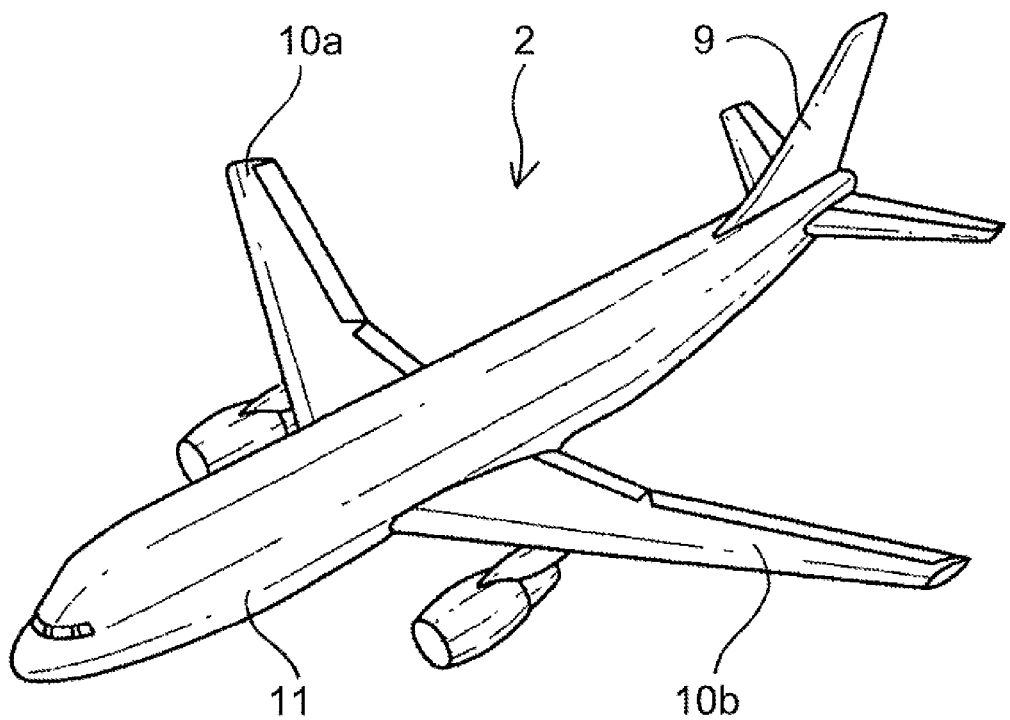
FIG. 1 is a perspective view of an aircraft.

The reference symbols used in the drawings, and their meanings, are listed in summary form in the list of reference symbols.

DETAILED DESCRIPTION

According to FIG. 1 an aircraft 2 essentially comprises a vertical tail plane 9, two wings 10a and 10b and a fuselage 11. These parts are usually made of composite materials comprising a stiffened shell structure 3 consisting of a skin 4, and stringers 5 arranged on an inner side of the skin 4. The wings 10a and 10b of the aircraft 2 are swept rearward. By sweeping the wings 10a and 10b rearward at higher flight load levels than 1 g there is increased inboard loading which makes it possible to save weight. An additional portion of inboard loading can be gained if anisotropic composite material is used. Then the elastic properties of a wing box 1 can be composed in such a way that the angle of attack decreases with increasing span at higher flight loads. Nose-down twist is generated by a bending twist coupling of the wing box 1 designed specifically with anisotropic characteristics.

Figure 2:
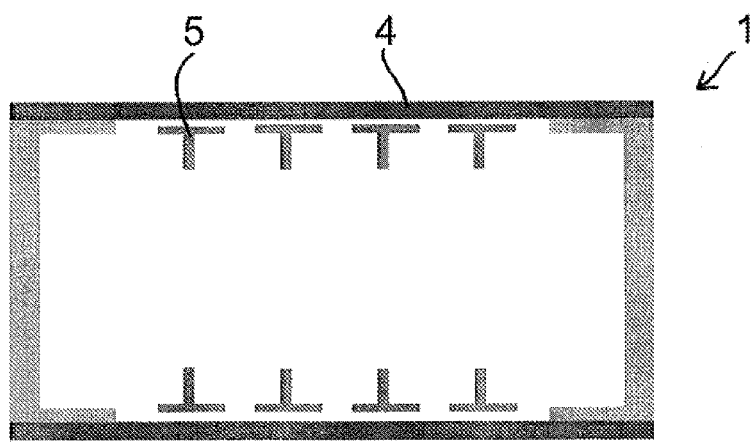
FIG. 2 is a schematic transversely cut through a wing box of an aircraft according to the state of the art.

FIG. 2 shows a schematic transversely cut through a wing box 1 of the aircraft 2 according to the state of the art. The skin 4 of the wing box 1 is reinforced with several T-shaped stringers 5 on the inner side of the wing box 1. The mass of the wing box 1 concentrates mainly in skin 4, so that especially the skin 4 contributes to axial stiffness. Therefore, the stringers 5 have a low area. Furthermore, the stringer stability is low and skin buckling involves stringers 5, wherein there is no post-buckling capability.

Figure 3:
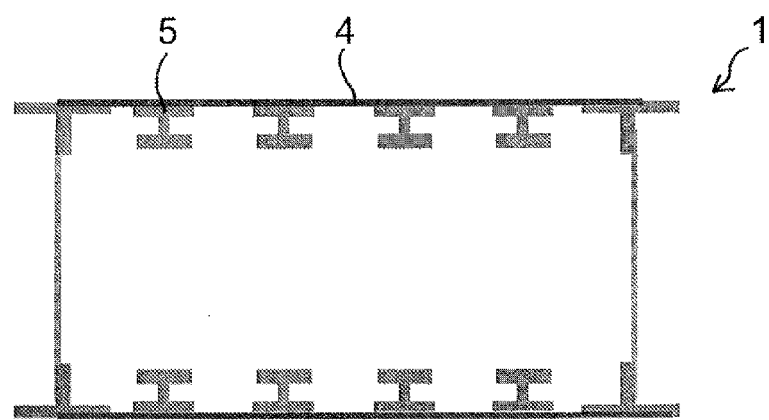
FIG. 3 is a schematic transversely cut through a wing box of an aircraft according to an embodiment of the invention.

According to FIG. 3 the wing box 1 of an aircraft 2 according to an embodiment of the invention comprises double T-shaped stringers 5, which reinforce the relatively thin skin 4 of the wing box 1. The mass of the wing box 1 concentrates mainly in stringers 5, so that the skin 4 does not contribute to axial stiffness. The stringers 5 provide more than 80% of the axial stiffness. This design offers a high weight saving potential. The weight of the wing box 1 decreases, because of the thin skin 4, which absorbs mainly shear. Axial loads are completely absorbed by the robust and compact stringers 5. The stiffened shell structure 3 becomes more robust and has a higher damage tolerance capability. Using fiber-reinforced layers for the skin 4, which have 30°-direction, or 45°-direction layers increases the damage tolerance capability. The axial stiffness of the stringers 5 is increased by using 75% of 0°-direction layers and 25% of 45°-direction layers or 30°-directional layers in case of skin 4 made out of +/−30°-directional layers.

Figure 4:
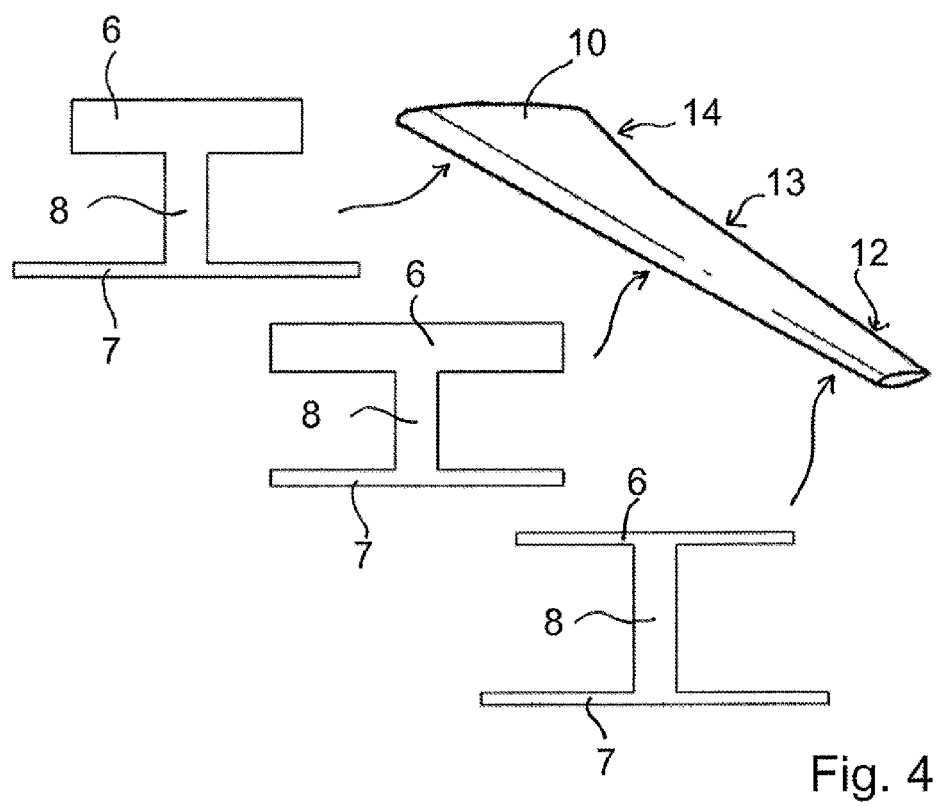
FIG. 4 is a perspective view of a wing of an aircraft with the different types of stringers according to a further embodiment of the invention.

FIG. 4 is a perspective view of a wing 10 of an aircraft 2 with the different types of stringers 5 according to a further embodiment of the invention. The stringers 5 have double T-shaped cross-section, comprising three parts, a flange 6 being arranged at the skin 4 and forming an distal end, a foot 7 showing away from the skin 4 and forming another distal end and a web 8 being arranged between the distal ends and connecting them to each other. Because of the increased nose-down twist which is induced by the forward swept fibers 15 of the skin at the outer wing 12, the inboard loading is increased and the bending moment at the wing root decreased. The flange 6, which is arranged on the skin 4, is at the outer wing 12 very thin compared to the flange 6 of the stringer 5 at the middle wing 13 or at an inner wing 14. Furthermore, the centre of gravity is closer to the skin 4 at the middle wing 13 and at the inner wing 14.

Figure 5:
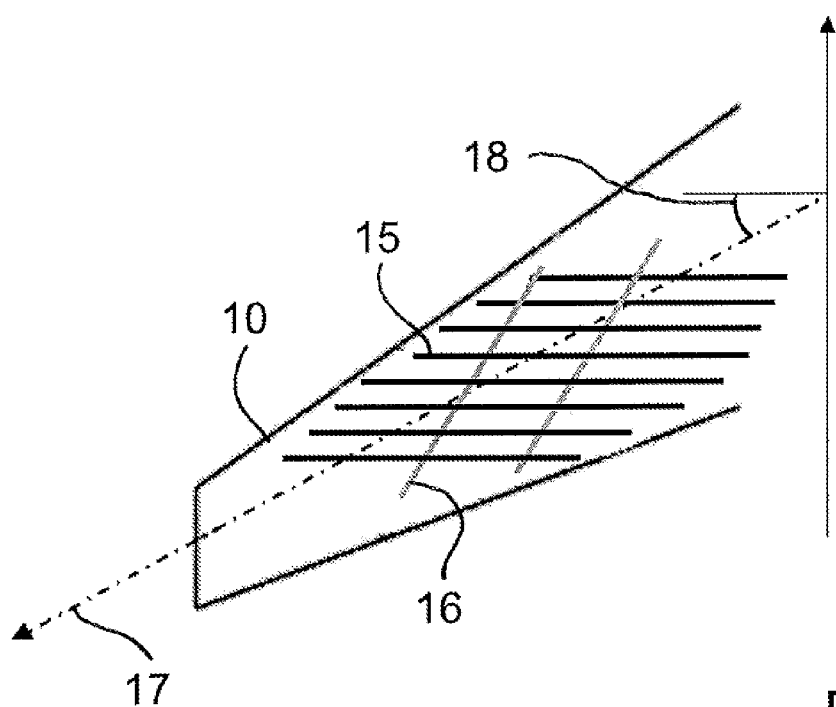
FIG. 5 is a schematic view of the unbalanced laminates of the skin of a wing with a wing sweep angle of +30°.

FIG. 5 is a typical layout of the skin 4 of the wing 10 with 80% of −30°-direction forward swept fibers 15 and 20% of +30°-direction rearward swept fibers 16. The fiber sweep angle is measured between wing axis 17 and fiber orientation. The most effective fiber sweep angle in terms of nose-down twist is equal to the wing sweep angle 18, here about 30°.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art and practicing the claimed invention, from a study of the drawings, the disclosure, and the appended claims. In particular, it is possible to use the stiffened shell structure for building a vertical tail plane 9 or a fuselage 11. One significant idea is to split the division of load between stringers 5 and skin 4. Since the skin 4 is no longer used for bending and axial loads, a thinner skin 4 can be expected. Bigger, more robust stringers 5 compensate the loss of strength and stability. Anisotropic material increases nose-down twist and the strength in determined directions.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

REFERENCE SIGNS

1 wing box
2 aircraft
3 stiffened shell structure
4 skin
5 stringer
6 flange
7 foot
8 web
9 vertical tail plane
10a, 10b wing
11 fuselage
12 outer wing
13 middle wing
14 inner wing
15 forward swept fibers
16 rearward swept fibers
17 wing axis
18 wing sweep angle

The invention claimed is:

1. A wing box of an aircraft with a stiffened shell structure comprising fiber reinforced material, the shell structure comprising a skin for absorbing shear loads, and a plurality of stringers arranged on an inner side of the wing box for absorbing axial loads,
   wherein at least 60% of mass of the stiffened shell structure is concentrated in the stringers, and
   wherein the stringers provide at least 80% of axial stiffness of the stiffened shell structure.

2. The wing box of claim 1, wherein the stiffened shell structure comprises at least one stringer with different cross-section dimensions.

3. The wing box of claim 1, wherein the skin and the stringers are made of layers comprising carbon fiber reinforced plastic.

4. The wing box of claim 1, wherein the skin is made of unbalanced laminates with up to 80% of forward swept fibers and 20% of rearward swept fibers.

5. The wing box of claim 1, wherein the skin consists of at least 50% up to 100% of at least one of 30°-direction and 45°-direction layers, wherein 45°-direction represent a main shear direction.

6. The wing box of claim 1, wherein the skin has a thickness of at least 1.8 mm up to 8 mm.

7. The wing box of claim 1, wherein the stringers consist of at least one of 0°-direction and 45°-direction layers, wherein 45°-direction represents a main shear direction.

8. The wing box of claim 1, wherein the skin consists of 30°-direction layers and the stringers consist of at least one of 0°-direction and 30°-direction layers.

9. The wing box of claim 1, wherein the stringers consist of at least 75% of 0°-direction layers.

10. The wing box of claim 1, wherein the stringers have a double T-shaped cross-section comprising:
    a flange arranged at the skin and forming a first end;

a foot disposed away from the skin and forming distal second end; and a web being arranged between the first and second ends and connecting the first and second ends to each other.

11. The wing box of claim 10, wherein the flange has a width of at least 60 mm up to 120 mm and a thickness of at least 2 mm up to 18 mm.

12. The wing box of claim 10, wherein the foot has a width of at least 60 mm up to 120 mm and a thickness of at least 2 mm up to 6 mm.

13. The wing box of claim 10, wherein the web has a height of at least 50 mm up to 60 mm and a thickness of at least 4 mm up to 18 mm.

* * * * *